United States Patent
Brown et al.

(10) Patent No.: US 8,086,826 B2
(45) Date of Patent: Dec. 27, 2011

(54) DEPENDENCY TRACKING FOR ENABLING SUCCESSIVE PROCESSOR INSTRUCTIONS TO ISSUE

(75) Inventors: Mary Douglass Brown, Austin, TX (US); William Elton Burky, Austin, TX (US); Dung Quoc Nguyen, Austin, TX (US); Balaram Sinharoy, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 304 days.

(21) Appl. No.: 12/409,934

(22) Filed: Mar. 24, 2009

(65) Prior Publication Data

US 2010/0250900 A1    Sep. 30, 2010

(51) Int. Cl.
G06F 9/38    (2006.01)
G06F 9/52    (2006.01)

(52) U.S. Cl. ........................... 712/214; 712/219
(58) Field of Classification Search ............... 712/214, 712/219
See application file for complete search history.

(56) References Cited

U.S. PATENT DOCUMENTS

| | | | |
|---|---|---|---|
| 5,367,650 A | | 11/1994 | Sharangpani et al. |
| 5,699,537 A | * | 12/1997 | Sharangpani et al. ........ 712/217 |
| 5,809,550 A | | 9/1998 | Shukla et al. |
| 5,870,577 A | * | 2/1999 | Patel et al. .................... 712/215 |
| 6,021,485 A | * | 2/2000 | Feiste et al. ................... 712/216 |
| 6,301,651 B1 | * | 10/2001 | Chang et al. .................. 712/202 |
| 6,463,523 B1 | * | 10/2002 | Kessler et al. ................ 712/216 |
| 6,678,810 B1 | * | 1/2004 | Palanca et al. ................ 711/163 |

OTHER PUBLICATIONS

Caprita—"Grouped Distributed Queues: Distributed Queue, Proportional Share Multiprocessor Scheduling"—Annual ACM Symposium on Principles of Distributed Computing, pp. 72-81 (Jul. 2006).
Choi—"A General Framework for Prefetch Scheduling in Linked Data Structures and its Application to Multi-Chain Prefetching"—ACM transactions on Computer Systems TOCS, pp. 214-280 (May 2004).
Clark—"Application-Specific Processing on a General-Purpose Core via Transparent Instruction Set Customization"—International Symposium on Microarchitecture—Proceedings of the $37^{th}$ annual IEEE/ACM International Symposium on Microarchitecture, pp. 1-11 (Dec. 2004).

* cited by examiner

*Primary Examiner* — Daniel Pan
(74) *Attorney, Agent, or Firm* — Stephen R. Tkacs; Stephen J. Walder, Jr.; Diana R. Gerhardt (57) ABSTRACT

An information handling system includes a processor with an issue unit (IU) that may perform instruction dependency tracking for successive instruction issue operations. The IU maintains non-shifting issue queue (NSIQ) and shifting issue queue (SIQ) instructions along with relative instruction to instruction dependency information. A mapper maps queue position data for instructions that dispatch to issue queue locations within the IU. The IU may test an issuing producer instruction against consumer instructions in the IU for queue position (QPOS) and register tag (RTAG) matches. A matching consumer instruction may issue in a successive manner in the case of a queue position match or in a next processor cycle in the case of a register tag match.

25 Claims, 5 Drawing Sheets

DEPENDENCY TRACKING FOR ENABLING SUCCESSIVE PROCESSOR INSTRUCTIONS TO ISSUE

This invention was made with United States Government support under Agreement No. HR0011-07-9-0002 awarded by DARPA. The Government has certain rights in the invention.

BACKGROUND

The disclosures herein relate generally to processors, and more specifically, to processors that employ instruction issue queue dependency management.

Modern information handling systems (IHSs) often execute instructions out-of-order to achieve greater processing efficiency. Because out-of-order instruction handling is common in modern IHSs, processors typically track the dependencies between instructions that issue to execution units from an issue unit within the processor. An issue unit may include multiple issue queues that store instructions for execution and maintain relative instruction dependency information. Relative instruction dependency information may include dependency information of a particular instruction in one issue queue to that of another instruction in a different issue queue of the issue unit. An instruction that is dependent upon the results of another instruction is one type of a "consumer" instruction. The instruction providing results that the consumer instruction depends upon is one type of "producer" instruction. Producer and consumer instructions may reside within the same issue queue or between multiple issues queues within a processor issue unit.

The dependencies of a consumer instruction may include data dependencies, address dependencies, and other dependencies. A particular consumer instruction may issue to an execution unit when the processor determines that the dependencies for that particular consumer instruction are met. That particular consumer instruction may issue to an execution unit within the processor for further processing. The issue queue that issues a producer instruction to an execution unit may issue a register tag (RTAG) broadcast for that producer instruction. The RTAG, register tag, or register identifier of an issuing producer instruction identifies the particular register that a consumer instruction may require as a dependency. The RTAG broadcast may communicate to all instructions of the issue unit, such as a particular consumer instruction. The particular consumer instruction "wakes up" upon the broadcast of the RTAG that that particular consumer instruction requires. On the next processor cycle, that particular consumer instruction may issue since the register information it requires is available. The issue queue that manages a particular consumer instruction may issue that consumer instruction for execution when all dependencies for that consumer instruction are met.

BRIEF SUMMARY

Accordingly, in one embodiment, a method of processing instructions, is disclosed. The method includes decoding, by a decoder, instructions in a stream of instructions, some instructions of which exhibit dependencies, the instructions including a producer instruction and a consumer instruction. The method also includes dispatching, by a dispatch unit, a producer instruction to a non-shifting issue queue (NSIQ) in an issue unit. The method also includes dispatching, by the dispatch unit, a consumer instruction to a shifting issue queue (SIQ) in the issue unit. The method further includes storing, by the NSIQ, producer instruction queue position information for the producer instruction. The method further includes storing, by the SIQ, consumer instruction queue position information for the consumer instruction. The method still further includes issuing, by the issue unit, the producer instruction. The method also includes testing, by the issue unit, to determine if the producer instruction queue position information matches the consumer instruction queue position information. The method also includes issuing, by the issue unit, the consumer instruction consecutively with respect to the producer instruction if the producer instruction queue position information matches the consumer instruction queue position information.

In another embodiment, a processor is disclosed that includes a decoder that decodes instructions in a stream of instructions, some instructions of which exhibit dependencies, the instructions including a producer instruction and a consumer instruction. The processor includes a dispatch unit, coupled to the decode unit, that dispatches a producer instruction to a non-shifting issue queue (NSIQ) in an issue unit, the dispatcher dispatching a consumer instruction to a shifting issue queue (SIQ) in the issue unit, the issue unit being coupled to the dispatch unit. The NSIQ stores producer instruction queue position information for the producer instruction, and the SIQ stores consumer instruction queue position information for the consumer instruction. The processor also includes a first test circuit, situated in the issue unit, that tests to determine if the producer instruction queue position information matches the consumer instruction queue position information. In response to the test, the issue unit issues the consumer instruction consecutively with respect to the producer instruction if the producer instruction queue position information matches the consumer instruction queue position information.

BRIEF DESCRIPTION OF THE DRAWINGS

The appended drawings illustrate only exemplary embodiments of the invention and therefore do not limit its scope because the inventive concepts lend themselves to other equally effective embodiments.

DETAILED DESCRIPTION

One embodiment of the disclosed information handling system (IHS) employs a processor that includes an issue unit (IU). The IU may include multiple issue queues for management of multiple processor instructions. An issue queue may issue an instruction to an execution unit for execution. The IU and more particularly the issue queue may manage dependencies for that instruction to determine eligibility for issue.

When a particular instruction's dependencies are met, that instruction is known as "issue ready", or ready for issue to an execution unit for execution. The IU may manage instruction dependencies that correspond to multiple instructions in different issues queues and the relative dependency between those instructions.

In one embodiment, the IU employs a non-shifting issue queue (NSIQ) and a shifting issue queue (SIQ). The NSIQ described below may include a "producer instruction" that provides a result, such as a register result for a "consumer" instruction. The SIQ as described below may include a consumer instruction that is dependent or has a dependency on the result of the producer instruction such as a register result. In one example, the register result is a condition register result. The producer instruction generates a condition register result as output, and the consumer instruction requires that condition register result as input. The NSIQ and SIQ work together to communicate the status of producer dependencies providing best timing for consumer instruction issue.

In one embodiment of an IU instruction issue process, a producer instruction issues during a particular processor cycle. On the next processor cycle, or later, the consumer instruction that is dependent upon the prior producer instruction issues. The consumer instruction "wakes-up" or issues from the issue queue that stores the consumer instruction. This wake-up process is useful for out-of-order instruction issues, particularly in processor branch issue queues. In a fast wake-up process, the consumer instruction issues in a back-to-back or successive manner to the producer instruction. In that case, the producer instruction provides the destination dependency or results for the consumer instruction source dependency or needs. In one embodiment, the disclosed consumer instruction fast wake-up issue process does not require processor cycle time for dependency data analysis.

Figure 1:
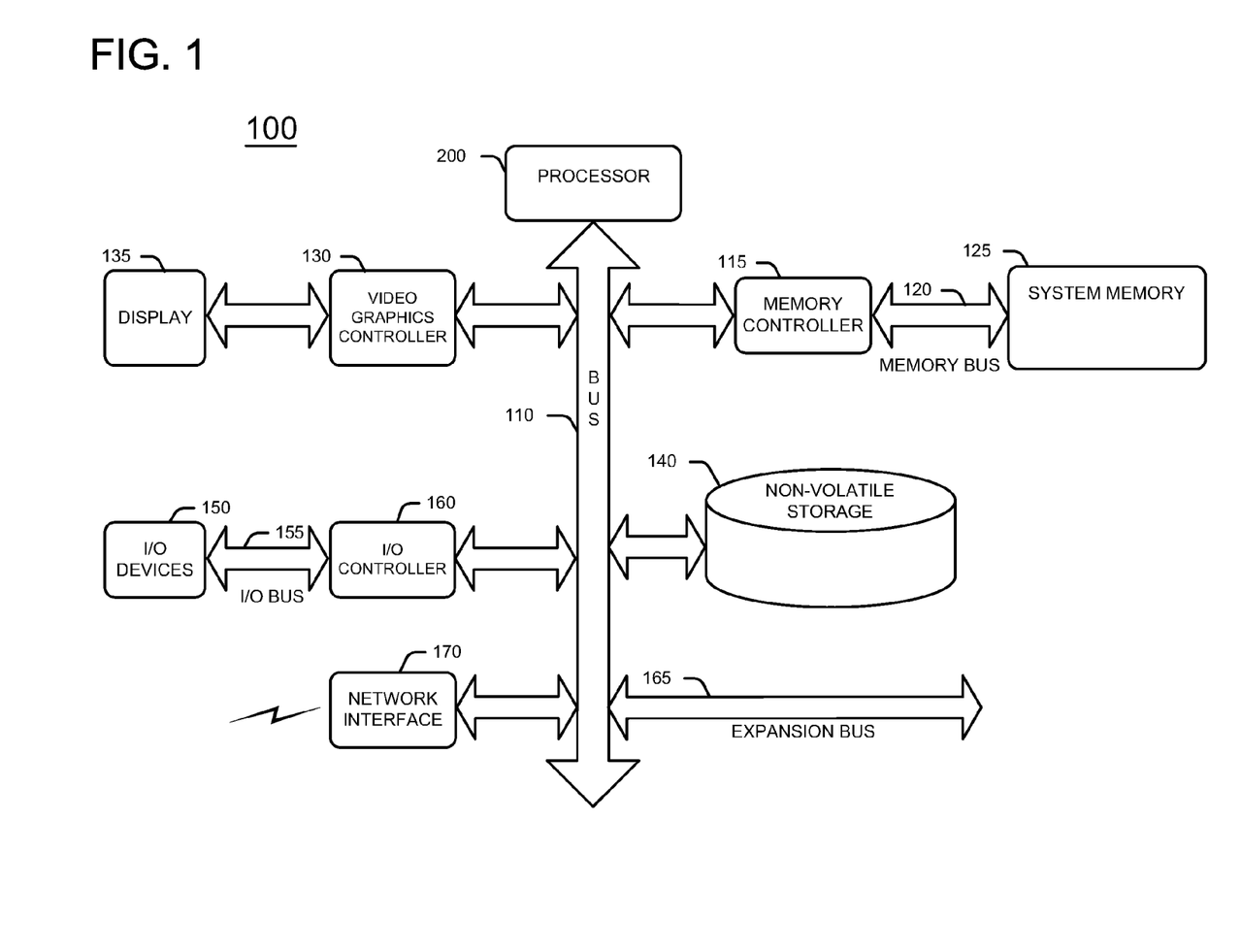
FIG. 1 is block diagram of an information handling system (IHS) that includes the disclosed processor with issue unit (IU) instruction dependency tracking successive issue methodology.

FIG. 1 shows an information handling system (IHS) 100 that includes a processor 200 that may employ the disclosed instruction dependency tracking successive issue method. Processor 200 couples to a bus 110. A memory controller 115 couples to bus 110. A memory bus 120 couples system memory 125 to memory controller 115. A video graphics controller 130 couples display 135 to bus 110. IHS 100 includes nonvolatile storage 140, such as a hard disk drive, CD drive, DVD drive, or other nonvolatile storage that couples to bus 110 to provide IHS 100 with permanent storage of information. Nonvolatile storage 140 is a form of data store. I/O devices 150, such as a keyboard and a mouse pointing device, couple via an I/O bus 155 and an I/O controller 160 to bus 110.

One or more expansion busses 165, such as USB, IEEE 1394 bus, ATA, SATA, eSATA, PCI, PCIE and other busses, couple to bus 110 to facilitate the connection of peripherals and devices to IHS 100. A network interface 170 couples to bus 110 to enable IHS 100 to connect by wire or wirelessly to other network devices. IHS 100 may take many forms. For example, IHS 100 may take the form of a desktop, server, portable, laptop, notebook, or other form factor computer or data processing system. IHS 100 may also take other form factors such as a personal digital assistant (PDA), a gaming device, a portable telephone device, a communication device or other devices that include a processor and memory.

Figure 2:
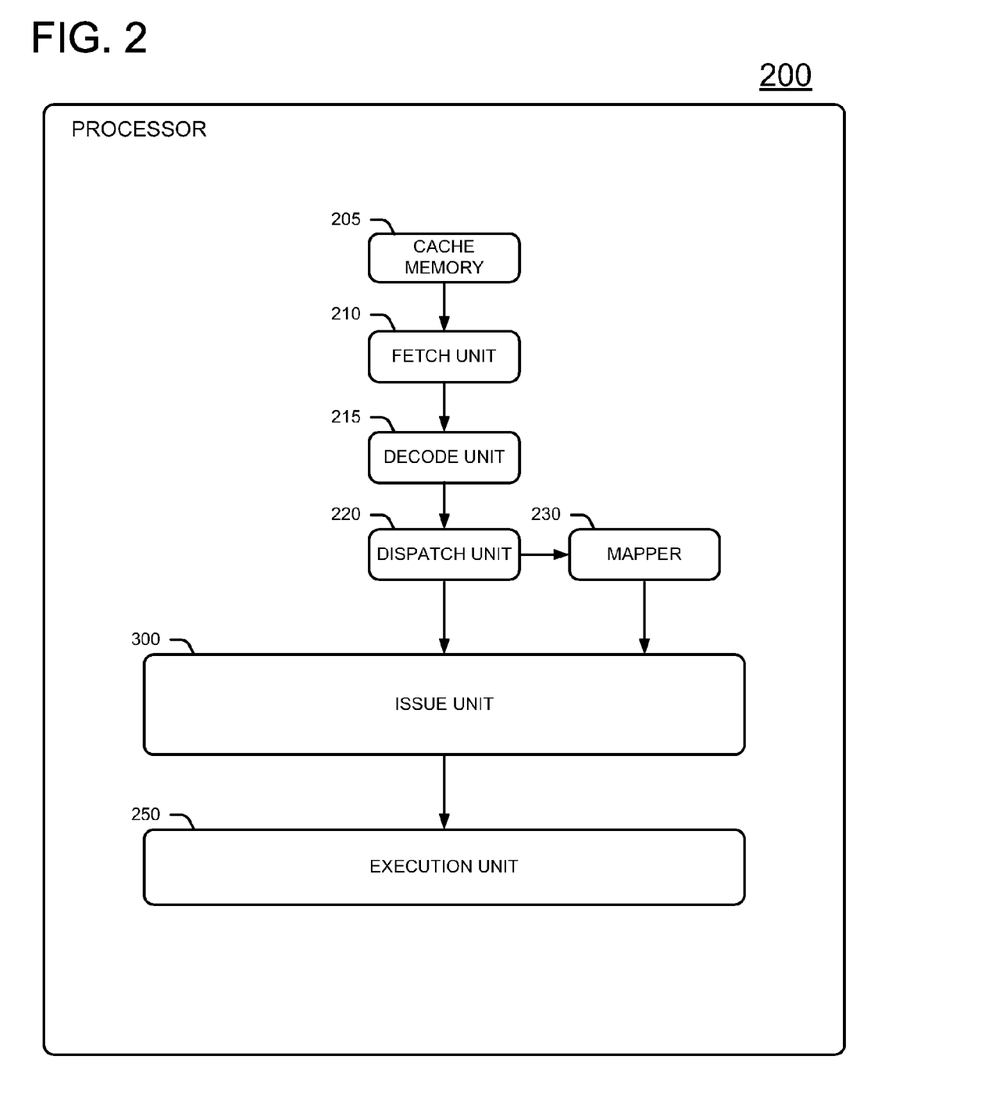
FIG. 2 is a block diagram showing more detail of the processor that employs the instruction dependency tracking successive issue methodology.

FIG. 2 shows a processor 200 that may employ the disclosed instruction dependency tracking and successive issue method. In that case, processor 200 performs the functional blocks of the flowchart of FIG. 5 described below that apply to the IU instruction dependency and issue handling process. Processor 200 includes a cache memory 205 that may receive processor instructions from system memory 125, non-volatile storage 140, expansion bus 165, network interface 170, or other sources not shown in FIG. 2. Cache memory 205 couples to a fetch unit 210 that processor 200 employs to fetch multiple instructions from cache memory 205. Instructions may be in the form of an instruction stream that includes a series or sequence of processor program instructions. Fetch unit 210 couples to a decode unit 215 that provides decoding of instructions as resources of processor 200 become available. Decode unit 215 decodes and identifies producer instructions, consumer instructions, and other instructions. Decode unit 215 couples to a dispatch unit 220 that may dispatch producer instructions, consumer instructions, and other instructions of the instruction stream of processor 200.

In one embodiment, dispatch unit 220 couples to a mapper 230 and an issue unit (IU) 300. Mapper 230 couples to IU 300 to provide instruction queue store position information as well as other information for instructions therein. In one embodiment, mapper 230 maintains queue position (QPOS) data for all instructions that dispatch unit 220 dispatches. In another embodiment, mapper 230 maintains QPOS data for the last instruction that dispatch unit 220 dispatches. IU 300 may include multiple issue queues (IQs) as described in more detail below. IU 300 couples to execution unit EU 250. EU 250 may include multiple execution units for execution of IU 300 instructions. Processor 200 corresponds to a semiconductor die that contains the structures of the processor described herein.

Figure 3:
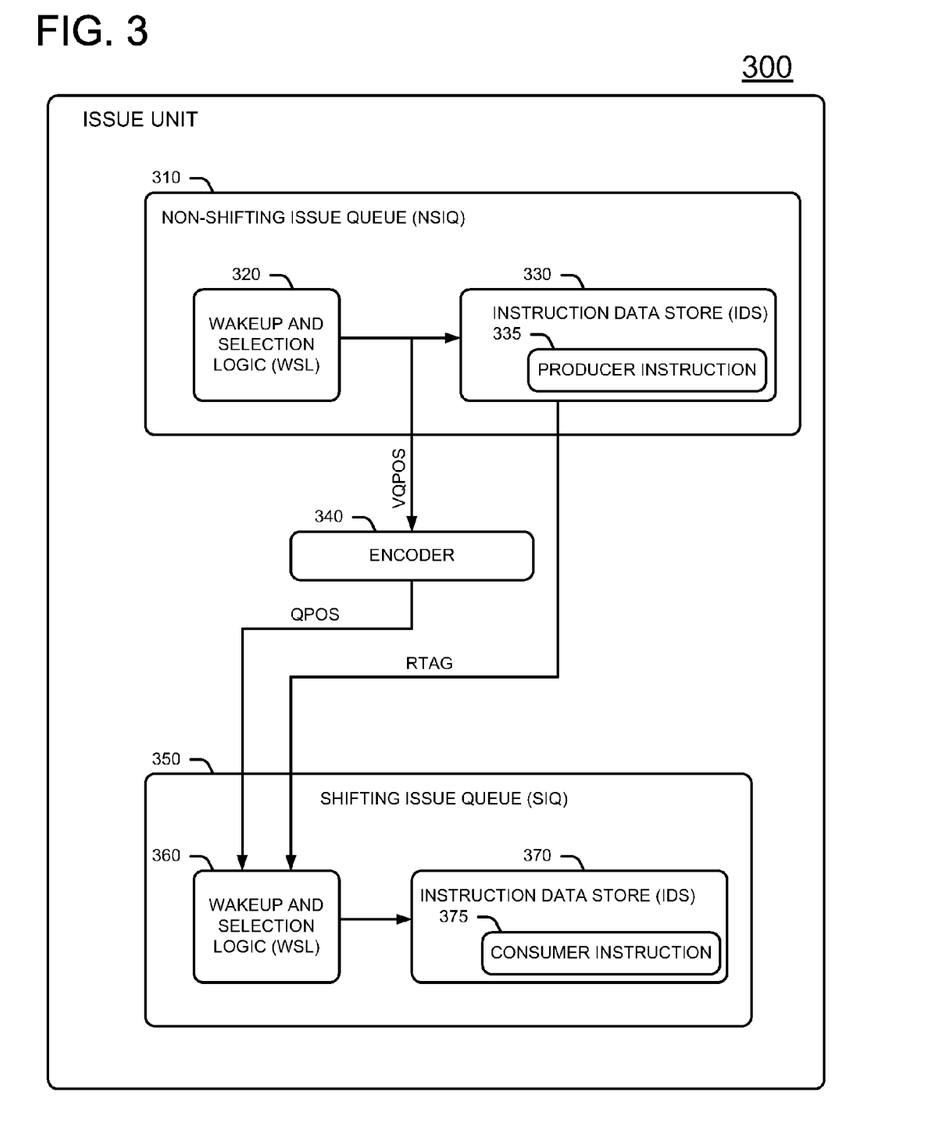
FIG. 3 depicts more detail of the issue unit (IU) that employs the instruction dependency tracking successive issue methodology.

FIG. 3 shows more detail of IU 300 that employs the disclosed instruction dependency tracking and successive issue method. In one embodiment, IU 300 includes a non-shifting issue queue (NSIQ) 310. The NSIQ 310 does not shift or move instructions that store within NSIQ 310 after dispatch. In other words, instructions store within NSIQ 310 in a fixed store position or location. As a particular instruction issues, NSIQ 310 may de-allocate that particular issue queue location so that a next dispatching instruction may store in that particular issue queue location. In this manner, NSIQ 310 instruction stores are fixed and non-shifting.

NSIQ 310 includes wake-up and selection logic (WSL) 320 to manage the selection and initiation of instruction issues for instructions that store within NSIQ 310. NSIQ 310 includes an instruction data store (IDS) 330 that includes the instruction data. IDS 330 includes instruction operation code (opcode) as well as other instruction information. In one embodiment, IDS 330 stores a producer instruction 335. Producer instruction 335 may provide dependency information such as a register result for a corresponding consumer instruction or instructions within IU 300. IDS 330 of NSIQ 310 may store multiple producer instructions at the same time. NSIQ 310 may include other non-shifting issue queue instruction support functions or capabilities not shown.

WSL 320 couples to IDS 330 and an encoder 340. Encoder 340 receives instruction queue position QPOS data in the form of vectorized QPOS (VQPOS) data. For example, if IDS 330 stores 4 instructions, VQPOS is a 4 bit vector, or 4 bit binary code wherein each bit of the VQPOS data corresponds to a particular store instruction location within IDS 330. In another embodiment, IDS 330 may include storage for 50 instructions pending issue by NSIQ 310. In that case VQPOS is a 50 bit vector. In either case, one bit of VQPOS corresponds to one store location within IDS 330. In that manner, VQPOS is an address pointer to one particular instruction store location in IDS 330 of NSIQ 310. IDS 330 may store other numbers of instruction than 4 or 50 which this embodiment provides for example purposes.

If NSIQ 310 issues producer instruction 335, WSL 320 provides VQPOS data for that particular instruction to encoder 340. NSIQ also provides RTAG data corresponding to producer instruction 335 to wake-up and selection logic (WSL) 360 of a shifting issue queue (SIQ) 350. The register tag (RTAG) or register identifier of an issuing producer instruction identifies the particular register that a consumer instruction may require as a dependency. Encoder 340 and IDS 330 couple to WSL 360 of SIQ 350. Encoder 340 generates an encoded queue position QPOS from VQPOS data of WSL 320. For example, encoder 340 may generate a hexadecimal equivalent of the vectorized data of the WSL 320 VQPOS data. In other words, QPOS is a hexadecimal equivalent of VQPOS for use by WSL 360 of SIQ 350. In one embodiment, SIQ 350 is a shifting issue queue, such as a branch issue queue, or other issue queue providing shifting or relative movement of instructions therein. WSL 360 couples to an instruction data store IDS 370 that provides instruction issue initialization and issue control for IDS 370. IDS 370 includes instruction operation code (opcode) information as well as other instruction information for SIQ 350. In one embodiment, IDS 370 may include a consumer instruction 375. Consumer instruction 375 of SIQ 350 is dependent upon the results of producer instruction 335. In other words, consumer instruction 375 exhibits a producer instruction 335 dependency.

In one embodiment, and as described in more detail below, NSIQ 310 may employ producer instruction 335 and SIQ 350 may employ a corresponding consumer instruction 375. WSL 320 may initiate the issue of producer instruction 335 within IDS 330 of NSIQ 310. When producer instruction 335 issues, NSIQ 310 broadcasts or communicates the VQPOS and RTAG data for that producer instruction to SIQ 350. For example, encoder 340 receives VQPOS data and generates corresponding QPOS data. Encoder 340 sends that QPOS data to WSL 360 of SIQ 350. IDS 330 generates RTAG data for producer instruction 335 and broadcasts or communicates that RTAG data to WSL 360 of SIQ 350. In this manner, a consumer instruction within SIQ 350 that requires the producer instruction results, such as consumer instruction 375, may rely on the QPOS or RTAG data to determine issue readiness. As described in more detail below, SIQ 350 may use QPOS data to initiate a fast wake-up process for consumer instruction 375. RTAG information processing may require more processor cycle time than the QPOS data. SIQ 350 may also use RTAG data for a consumer instruction issue wake-up process, although this may take more time.

Figure 4:
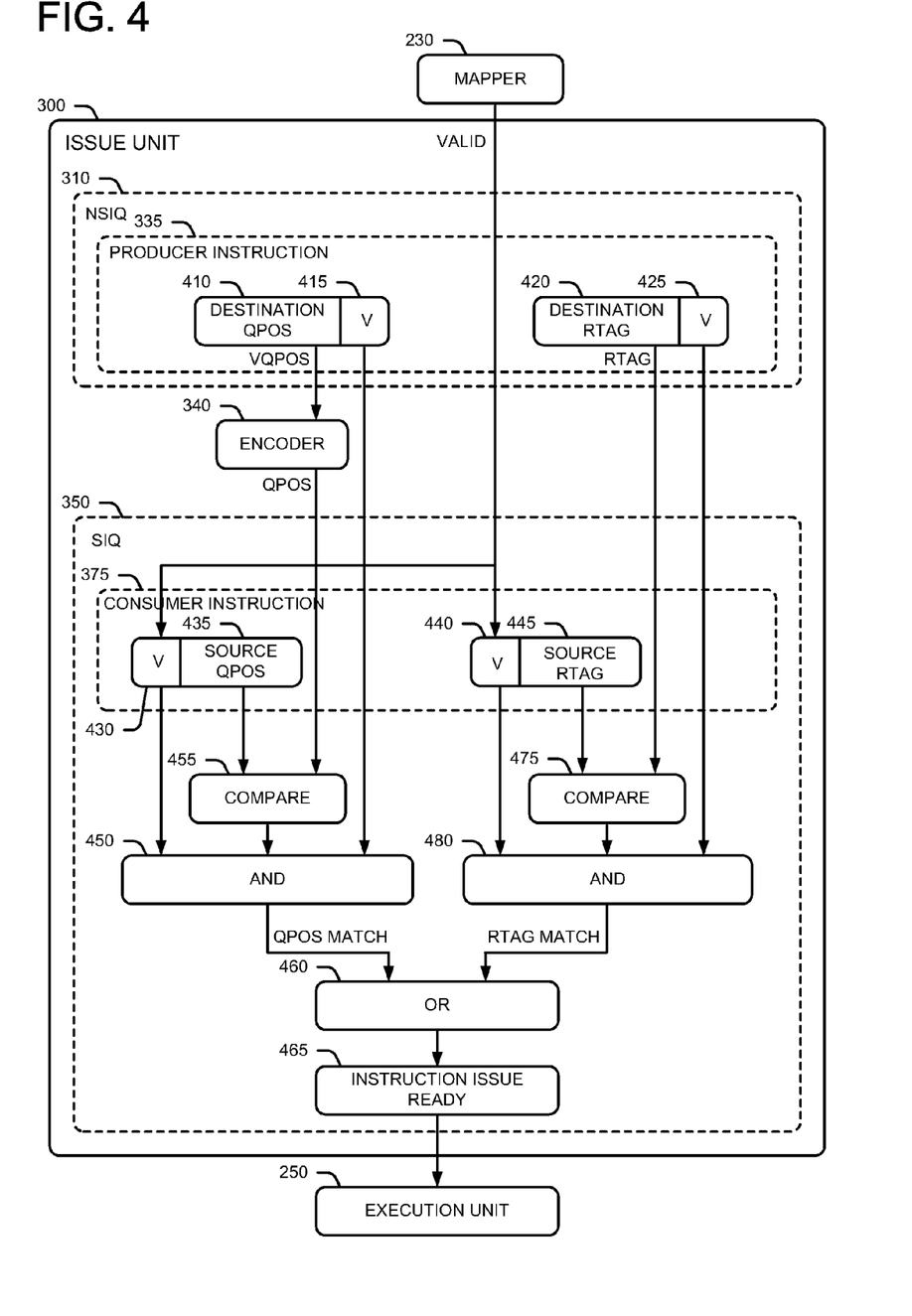
FIG. 4 is a block diagram that depicts even more detail of the issue unit (IU) that employs the instruction dependency tracking successive issue methodology.

FIG. 4 shows more detail of processor 200, and more specifically IU 300 that employs the disclosed instruction dependency tracking and successive issue method. FIG. 4 demonstrates the use of IU 300 employing NSIQ 310 and SIQ 350 during successive or back-to-back instruction issues. In one embodiment, mapper 230 maintains condition register pointer data for a condition register, not shown of processor 200. For example, mapper 230 maintains a QPOS of the last or youngest producer instruction of IDS 330 (not shown in FIG. 4) that dispatch unit 220 dispatches to NSIQ 310. In that example, the youngest producer instruction is the next instruction for issue from NSIQ 310. NSIQ 310 maintains information for producer instruction 335, such as a destination QPOS 410, and a valid bit (V) 415. Producer instruction 335 may include other information not shown. The destination QPOS 410 data is a pointer to the queue position or location within IDS 330 for producer instruction 335. That pointer data provides information to other entities of IU 300 that may have dependencies or other resource needs of producer instruction 335. For example, a consumer instruction may exhibit a dependency or require a register source for the output or register destination of a producer instruction of IU 300.

In one embodiment, IU 300 generates destination QPOS 410 data from producer instruction 335 information. In that case, IU 300 may not store destination QPOS 410 data within NSIQ 310. IU 300 may generate QPOS data such as destination QPOS 410 from IDS store location or position information such as that of producer instruction 335 within IDS 335. NSIQ 310 employs producer instruction 335 information, such as a destination RTAG 420, and a valid bit (V) 425. The destination RTAG 420 data is a pointer to the register tag (RTAG) position, such as a condition register number that producer instruction 335 generates upon execution by EU 250. That register pointer data, namely RTAG 420, provides information to other entities of IU 300 that may have dependencies or other resource needs of producer instruction 335. For example, consumer instructions and other instructions of IU 300 may include or exhibit dependencies for the producer instruction output, such as destination RTAG 420.

In a manner similar to NSIQ 310 above, SIQ 350 maintains records for each instruction, such as consumer instruction 375, within IDS 370. IDS 370 is not specifically depicted in FIG. 4 although IDS 370 stores consumer instruction 375 which is shown. Consumer instruction 375 may include more information than shown in FIG. 4. In one embodiment, SIQ 350 employs a valid bit (V) 430, and source QPOS 435 for consumer instruction 375. Consumer instruction 375 may require as a register source, or dependency, the output or register destination data from producer instruction 335 of NSIQ 310. SIQ 350 also maintains a valid bit (V) 440 and a source RTAG data for consumer instruction 375. When NSIQ 310 issues producer instruction 335, consumer instruction 375 of SIQ 350 may undergo a compare operation as described in more detail below. SIQ 350 may compare the source QPOS 435 or source RTAG 445 data with that of producer instruction 335 destination QPOS 410 and destination RTAG 420 data. In one embodiment, IU 300 compares both QPOS and RTAG data at different processor cycles, as described in more detail below.

To initiate a fast wake-up or sequential dependent instruction issue, mapper 230 sends V bit 430 to SIQ 350. During issue of the NSIQ 310 producer instruction 335, V bit 430 provides a valid bit input as the first of three inputs to AND circuit 450. The presence of V bit 430 indicates that consumer instruction 375 of SIQ 350 is valid for issue. In other words, mapper 230 determines that consumer instruction 375 has met all other dependency requirements other than producer instruction 335 dependency compares. Source QPOS 435 provides input to the first of two inputs of a comparator (COMPARE) 455. Encoder 340 encodes destination QPOS 410 data from a vector, such VQPOS to a hexadecimal QPOS result as the second of two inputs of COMPARE 455. COMPARE 455 acts as a test circuit that compares source QPOS 435 and destination QPOS 410 to determine if consumer instruction 375 of SIQ 350 matches as a dependency the results of NSIQ 310 producer instruction 335.

If the source QPOS 435 and destination QPOS 410 match, COMPARE 455 provides a positive match as the second of three inputs to AND 450. At AND circuit 450, NSIQ 310 V 415 provides the third input "valid" bit to generate a potential "QPOS match". NSIQ 310 may populate valid bit data for a particular instruction as invalid. For example, NSIQ 310 may populate V bit 415 as =0 or invalid in the case where a processor 200 instruction pipeline flush condition exists. A processor 200 instruction pipeline flush may occur after a branch misprediction fault requires the flush of a particular issue queue, such as SIQ 350, NSIQ 310, or other issue queue. In another case, where a particular instruction cannot forward output data, such as destination RTAG 420 data in a consecutive processor 200 cycle, NSIQ 310 sets that instructions valid bit, such as V bit 415=0 indicating an invalid state. Such an example may occur when a particular producer instruction, such as producer instruction 335, executes a floating-point compare instruction and requires multiple processor 200 cycles for execution by EU 250. In that second case, producer instruction 335 is a long latency instruction.

In a third case, NSIQ 310 may set the V bit 415 invalid when dispatch unit 220 dispatches producer instruction 335. In that manner, a QPOS match does not occur and SIQ 350 does not employ fast wake-up QPOS operations. For example dispatch unit 220 may dispatch particular producer instruction 335 into NSIQ 310. However dispatch unit 220 may not dispatch a particular corresponding consumer instruction into SIQ 350. Dispatch unit 220 may dispatch the particular corresponding consumer instruction into a non-branch issue queue, not shown. In that case, again a QPOS match and fast wake-up operation does not occur within IU 300. In a fourth case, IU 300 de-allocates a particular producer instruction, such as producer instruction 335, that employs destination QPOS 410 and destination RTAG 420 data. In that case, the corresponding consumer instruction, consumer instruction 375 may not issue, and thus NSIQ 310 invalidates V bit 415 and V bit 425. The invalid V bit 415, or invalid V bit 425 negates or invalidates the relative QPOS match, or RTAG match test as described in more detail below.

If all three inputs of AND 450 are true, IU 300 indicates a QPOS match. A QPOS match means that consumer instruction 375 of SIQ 350 is dependent upon and matches the output or destination of producer instruction 335 of NSIQ 310. In that example, consumer instruction 375 is immediately issue-ready, and does not require processor 200 cycle time to initiate instruction issue. In other words, consumer instruction 375 encounters a fast wake-up and issues immediately upon detection of a QPOS match to that of producer instruction 335. The output of AND 450 provides one of two inputs to OR circuit 460 that in turn provides an instruction issue ready 465 operation or action by IU 300. That matching consumer instruction 375 issues to EU 250 for further execution by processor 200. The QPOS match and subsequent consumer instruction issue employs a fast wake-up, or fast consumer instruction issue operation.

Mapper 230 sends V bit 440 data to SIQ 350 to provide for an RTAG wake-up sequence or "RTAG match" test. For example, during the issue of the NSIQ 310 producer instruction 335, V bit 440 provides a valid bit input as the first of three inputs to AND circuit 480. The presence of V bit 440 indicates the consumer instruction 375 of SIQ 350 is valid for issue at the next processor cycle. In other words, mapper 230 determines that consumer instruction 375 has met all other dependency requirements other than producer instruction 335 compare. Source RTAG 445 provides input to the first of two inputs of a COMPARE 475. NSIQ 310 provides destination RTAG 420 data from producer instruction 335 as the second of two inputs of COMPARE 475. COMPARE 475 acts as a test circuit that compares source RTAG 445 and destination RTAG 420 to determine if consumer instruction 375 of SIQ 350 matches as a dependency the results of NSIQ 310 producer instruction 335.

If the source RTAG 445 and destination RTAG 420 match, COMPARE 455 provides a positive match as the second of three inputs to AND 480. At AND 480, NSIQ 310 V 425 provides the third input "valid" bit to generate a potential "RTAG match". NSIQ 310 may populate valid bit data for a particular instruction as invalid. For example, NSIQ 310 may populate V bit 425 as =0 or invalid in special cases as described above in the QPOS match example of FIG. 4, and other cases or conditions where IU 300 determines producer instruction 335 to be invalid for issue. Functions such as COMPARE 455, COMPARE 475, AND 450, AND 480, OR 460, and other functions may be implemented in hardware logic functions, software, firmware or other methods within processor 200.

Figure 5:
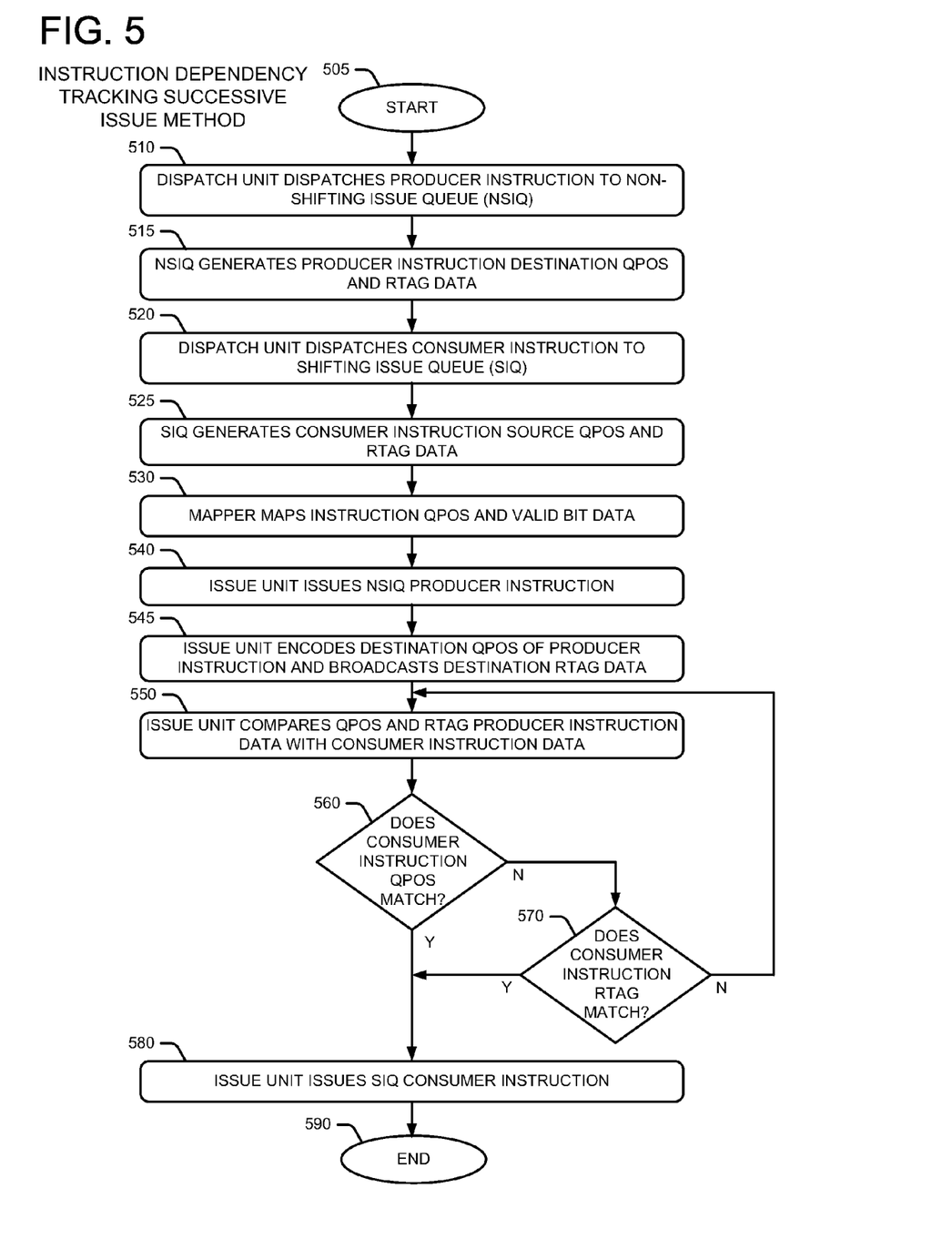
FIG. 5 is a flowchart that shows process flow in the processor of FIG. 2 as it employs the disclosed instruction dependency tracking successive issue method.

FIG. 5 shows a flowchart that describes one example of the disclosed instruction dependency tracking and successive issue method. The instruction dependency tracking and successive issue method starts, as per block 505. Dispatch unit 220 dispatches producer instruction 335 to NSIQ 310, as per block 510. During producer instruction 335 dispatch, NSIQ 310 generates producer instruction 335 destination QPOS 410 and destination RTAG 420 data, as per block 515. The producer instruction 335 destination QPOS 410 and destination RTAG 420 data store within NSIQ 310 with the producer instruction 335 opcode and other data not shown. In more detail, the destination QPOS 410 and destination RTAG 420 data for producer instruction 335 store within the NSIQ 310 IDS 330. The producer instruction 335 destination QPOS 410 and destination RTAG 420 data provide IU 300 with pointers to the particular register results from the producer instruction 335 of NSIQ 310. Subsequent instructions, such as consumer instruction 375 that depend or have dependencies on the particular register results of producer instruction 335 exhibit a register source or dependency relationship to producer instruction 335.

Dispatch unit 220 dispatches consumer instruction 375 to SIQ 350, as per block 520. In one embodiment, dispatch unit 220 dispatches consumer instruction 375 after the dispatch of producer instruction 335. In another embodiment, dispatch unit 220 dispatches producer instruction 335 and the consumer instruction 375 during the same processor cycle. SIQ 350 generates consumer instruction 375 source QPOS 435 and source RTAG 445 data, as per block 525. In one example, the consumer instruction 375 source QPOS 435 and source RTAG 445 data match the producer instruction 335 destination QPOS 410 and destination RTAG 420 data. In that example, the consumer instruction 375 is dependent upon the results of the producer instruction 335. Stated in another manner, consumer instruction 375 has producer instruction 335 dependencies that the issue unit 300 must satisfy prior to issue of the consumer instruction 375.

During dispatch, mapper 230 maps instruction QPOS and valid bit data, as per block 530. Mapper 230 maps QPOS data, such as destination QPOS 410 that relates to consumer instruction 375. For example, if consumer instruction 375 dispatches, mapper 230 generates valid bits V bit 430 and V bit 440 for that particular consumer instruction. In one embodiment, mapper 230 maintains or stores QPOS data for each instruction that dispatch unit 220 dispatches to IU 300. In another embodiment, mapper 230 maintains or stores QPOS data, such as destination QPOS 410 for the last or youngest instruction that dispatch unit 220 dispatches to IU 300. Mapper 230 may only store information on the last instruction to manage branch mispredictions or other processor 200 events.

IU 300 issues NSIQ 310 producer instruction 335, as per block 540. For example NSIQ 310 issues producer instruction 335 to EU 250 for further processing by processor 200. During producer instruction 335 issue, IU 300 encodes destination QPOS 410 and broadcasts destination RTAG 420 data, as per block 545. NSIQ 310 broadcasts the encoded producer instruction 335 QPOS and RTAG to SIQ 350. In one embodiment instructions of SIQ 350, such as consumer instruction 375, may wake-up upon receipt of destination QPOS or RTAG data as described below. IU 300 compares the destination QPOS and RTAG data of producer instruction 335 with consumer instruction 375 data, as per block 550. IU 300 may use a compare function such as COMPARE 455, COMPARE 475, or other function to compare QPOS and RTAG data.

IU 300 performs a test to determine if consumer instruction 375 QPOS matches, as per block 560. In other words, IU 300 tests to determine if the source QPOS 435 of consumer instruction 375 matches the destination QPOS 410 of producer instruction 335. A consumer QPOS match indicates that the producer instruction 375 issue satisfies the consumer instruction 375 dependency, and that consumer instruction 375 is eligible for a fast wake-up. If consumer instruction 375 does not provide a QPOS match, IU 300 performs a test to determine if consumer instruction 375 RTAG matches, as per block 570. Consumer instruction 375 RTAG match indicates that consumer instruction 375 dependency is met by the producer instruction 335 issue and execution. In that manner, the consumer instruction 375 of SIQ 350 is eligible for a wake-up. If consumer instruction 375 does not provide an RTAG match, IU 300 continues compare of QPOS and RTAG producer instruction 335 data, as per block 550. However if the consumer instruction 375 RTAG matches, IU 300 issues consumer instruction 375, as per block 580.

In the case where the consumer instruction 375 QPOS matches, IU 300 immediately issues consumer instruction 375, as per block 580. In that manner, SIQ 350 issues consumer instruction 375 in a fast wake-up mode. A fast wake-up avoids the need to perform a consumer instruction 375 RTAG match test. However, the consumer instruction 375 RTAG match test may still execute after the consumer instruction 375 QPOS match test. The instruction dependency tracking and successive issue method ends, as per block 590.

The foregoing discloses methodologies wherein a processor may employ issue unit instruction dependency tracking operations after instruction dispatch. A decode unit may decode processor instructions that include multiple branch instructions with dependencies between them. A dispatch unit may dispatch dependent instructions to separate issue queues of an issue unit. The issue unit maintains separate non-shifting issue queue and shifting issue queue instruction information. The non-shifting issue queue may store a producer instruction with destination data as output.

The shifting issue queue may store a consumer instruction dependent upon the producer instruction destination data. A mapper maintains queue position data to provide a fast wake-up opportunity for the consumer instruction. During producer instruction issue, if the producer instruction queue position data matches the consumer instruction queue position data, the consumer instruction issues in a consecutive manner to the producer instruction. During producer instruction issue, if the register tag data of the producer instruction matches the register tag data of the consumer instruction, the consumer instruction may issue in a next processor cycle from the producer instruction.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of processing instructions, comprising:
   decoding, by a decoder, instructions in a stream of instructions, some instructions of which exhibit dependencies, the stream of instructions including a producer instruction and a consumer instruction;
   dispatching, by a dispatch unit, a producer instruction to a non-shifting issue queue (NSIQ) in an issue unit;
   dispatching, by the dispatch unit, a consumer instruction to a shifting issue queue (SIQ) in the issue unit;
   storing, by the NSIQ, producer instruction queue position information for the producer instruction;
   storing, by the SIQ, consumer instruction queue position information for the consumer instruction;
   issuing, by the issue unit, the producer instruction;
   testing, by the issue unit, to determine if the producer instruction queue position information matches the consumer instruction queue position information; and
   issuing, by the issue unit, the consumer instruction consecutively with respect to the producer instruction if the producer instruction queue position information matches the consumer instruction queue position information.

2. The method of claim 1, wherein the producer instruction queue position information includes destination information, and wherein the decoder, dispatch unit, NSIQ, SIQ and issue unit reside within a processor.

3. The method of claim 2, wherein the consumer instruction queue position information includes source information.

4. The method of claim 1, further comprising:
   storing, by the NSIQ, destination register information for the producer instruction;
   storing, by the SIQ, source register information for the consumer instruction;
   issuing, by the issue unit, the producer instruction;
   testing, by the issue unit, to determine if the destination register information for the producer instruction matches the source register information for the consumer instruction;
   issuing, by the issue unit, the consumer instruction in a next processor cycle after issuing the producer instruction if the destination register information for the producer instruction matches the source register information for the consumer instruction.

5. The method of claim 1, further comprising encoding, by an encoder, producer instruction dependency information.

6. The method of claim 1, wherein the encoding further comprises converting a vector queue position pointer to a numerical queue position to provide the producer instruction queue position information.

7. The method of claim 1, further comprising mapping, by a mapper, producer instruction dependency information that includes consumer instruction queue position information.

8. The method of claim 7, wherein the mapper maps instruction dependency information for all instructions in the issue unit.

9. The method of claim 7, wherein the mapper maps instruction dependency information for a most recently dispatched instruction in the issue unit.

10. The method of claim 7, wherein in response to a flush event the mapper invalidates a group of related instructions in the shifting issue queue (SIQ).

11. The method of claim 7, wherein in response to a flush event the mapper invalidates a consumer instruction in the shifting issue queue (SIQ).

12. A processor, comprising:
  a decoder that decodes instructions in a stream of instructions, some instructions of which exhibit dependencies, the stream of instructions including a producer instruction and a consumer instruction;
  a dispatch unit, coupled to the decode unit, that dispatches a producer instruction to a non-shifting issue queue (NSIQ) in an issue unit, the dispatcher dispatching a consumer instruction to a shifting issue queue (SIQ) in the issue unit, the issue unit being coupled to the dispatch unit;
  wherein the NSIQ stores producer instruction queue position information for the producer instruction;
  wherein the SIQ stores consumer instruction queue position information for the consumer instruction;
  a first test circuit, situated in the issue unit, that tests to determine if the producer instruction queue position information matches the consumer instruction queue position information, and in response to the test the issue unit issues the consumer instruction consecutively with respect to the producer instruction if the producer instruction queue position information matches the consumer instruction queue position information.

13. The processor of claim 12, wherein the producer instruction queue position information includes destination information.

14. The processor of claim 13, wherein the consumer instruction queue position information includes source information.

15. The processor of claim 12, wherein the NSIQ stores destination register information for the producer instruction and further stores source register information for the consumer instruction, the issue unit including a second test circuit that, in response to issuing the producer instruction by the issue unit, tests to determine if the destination register information for the producer instruction matches the source register information for the consumer instruction, such that the issue unit issues the consumer instruction in a next processor cycle after issuing the producer instruction if the destination register information for the producer instruction matches the source register information for the consumer instruction.

16. The processor of claim 12, further comprising an encoder, coupled to the NSIQ, that encodes producer instruction dependency information by converting a vector queue position pointer to a numerical queue position to provide the producer instruction queue position information.

17. The processor of claim 12, further comprising a mapper, coupled to the issue unit, that maps producer instruction dependency information that includes consumer instruction queue position information.

18. The processor of claim 17, wherein the mapper maps instruction dependency information for all instructions in the issue unit.

19. The processor of claim 17, wherein the mapper maps instruction dependency information for a most recently dispatched instruction in the issue unit.

20. The processor of claim 17, wherein in response to a flush event the mapper invalidates a group of related instructions in the shifting issue queue (SIQ).

21. The processor of claim 17, wherein in response to a flush event the mapper invalidates a consumer instruction in the shifting issue queue (SIQ).

22. An information handling system (IHS), comprising:
  a memory that provides a stream of instructions, some instructions of which exhibit dependencies, the stream of instructions including a producer instruction and a consumer instruction;
  a processor, coupled to the memory, the processor including:
    a decoder that decodes instructions in a stream of instructions, some instructions of which exhibit dependencies, the instructions including a producer instruction and a consumer instruction;
    a dispatch unit, coupled to the decode unit, that dispatches a producer instruction to a non-shifting issue queue (NSIQ) in an issue unit, the dispatcher dispatching a consumer instruction to a shifting issue queue (SIQ) in the issue unit, the issue unit being coupled to the dispatch unit;
    wherein the NSIQ stores producer instruction queue position information for the producer instruction;
    wherein the SIQ stores consumer instruction queue position information for the consumer instruction;
    a first test circuit, situated in the issue unit, that tests to determine if the producer instruction queue position information matches the consumer instruction queue position information, and in response to the test the issue unit issues the consumer instruction consecutively with respect to the producer instruction if the producer instruction queue position information matches the consumer instruction queue position information.

23. The IHS of claim 22, wherein the NSIQ stores destination register information for the producer instruction and further stores source register information for the consumer instruction, the issue unit including a second test circuit that, in response to issuing the producer instruction by the issue unit, tests to determine if the destination register information for the producer instruction matches the source register information for the consumer instruction, such that the issue unit issues the consumer instruction in a next processor cycle after issuing the producer instruction if the destination register information for the producer instruction matches the source register information for the consumer instruction.

24. The IHS of claim 22, further comprising an encoder, coupled to the NSIQ, that encodes producer instruction dependency information by converting a vector queue position pointer to a numerical queue position to provide the producer instruction queue position information.

25. The IHS of claim 22, further comprising a mapper, coupled to the issue unit, that maps producer instruction dependency information that includes consumer instruction queue position information.

* * * * *